United States Patent
Matsunaga

(10) Patent No.: US 9,523,391 B2
(45) Date of Patent: Dec. 20, 2016

(54) ROLLING BEARING AND ITS PACKAGING METHOD

(71) Applicant: NSK LTD., Tokyo (JP)

(72) Inventor: Kyohei Matsunaga, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/134,454

(22) Filed: Apr. 21, 2016

(65) Prior Publication Data

US 2016/0230812 A1 Aug. 11, 2016

Related U.S. Application Data

(63) Continuation of application No. 14/655,403, filed as application No. PCT/JP2013/076967 on Oct. 3, 2013, now Pat. No. 9,377,057.

(30) Foreign Application Priority Data

May 31, 2013 (JP) .................................. 2013-115810

(51) Int. Cl.
*F16C 41/04* (2006.01)
*F16C 33/66* (2006.01)
*F16C 19/52* (2006.01)
*B65D 81/02* (2006.01)
(Continued)

(52) U.S. Cl.
CPC ............... *F16C 41/04* (2013.01); *B65D 81/02* (2013.01); *B65D 81/18* (2013.01); *B65D 81/26* (2013.01); *B65D 85/58* (2013.01); *F16C 19/52* (2013.01); *F16C 33/6603* (2013.01); *F16C 33/6607* (2013.01); *B65D 2585/6897* (2013.01); *C23F 11/00* (2013.01); *F16C 2223/32* (2013.01); *F16C 2240/60* (2013.01); *Y10T 29/49703* (2015.01); *Y10T 29/49707* (2015.01)

(58) Field of Classification Search
CPC .......... B65D 65/42; B65D 85/58; C23F 11/00; F16C 33/6603; F16C 33/6607; F16C 41/04
See application file for complete search history.

(56) References Cited

U.S. PATENT DOCUMENTS 4,311,738 A 1/1982 Chi
4,464,275 A 8/1984 Yasui
(Continued)

FOREIGN PATENT DOCUMENTS

CN 1853800 A 11/2006
EP 1666634 A1 6/2006
(Continued)

OTHER PUBLICATIONS

Communication issued Mar. 4, 2016, issued by the State Intellectual Property Office of the People's Republic of China in counterpart Chinese Patent Application No. 201380003309.X.
(Continued)

*Primary Examiner* — Phillip A Johnson
(74) *Attorney, Agent, or Firm* — Sughrue Mion, PLLC

(57) ABSTRACT

To provide a rolling bearing in which a favorable antirust performance can be obtained while reducing an amount of antirust oil than before, after removing chloride ions and sulfate ions from the entire surface of the bearing, antirust oil is provided to adhere thereto at an average film thickness of 4.5 μm to 10 μm, and the entire bearing is covered with a volatile corrosion inhibitor film such that a space between the volatile corrosion inhibitor film and the bearing is kept in a pressure-reduced condition.

12 Claims, 9 Drawing Sheets

(51) Int. Cl.
  *B65D 81/18*  (2006.01)
  *B65D 81/26*  (2006.01)
  *B65D 85/58*  (2006.01)
  *C23F 11/00*  (2006.01)

(56) References Cited

U.S. PATENT DOCUMENTS

| | | |
|---|---|---|
| 7,235,142 B2 | 6/2007 | Sturgill et al. |
| 2005/0178500 A1 | 8/2005 | Chevrette et al. |
| 2006/0065285 A1 | 3/2006 | Takahashi |
| 2008/0139420 A1 | 6/2008 | Takiuchi et al. |

FOREIGN PATENT DOCUMENTS

| | | |
|---|---|---|
| JP | 2003-239090 A | 8/2003 |
| JP | 2005-221071 A | 8/2005 |
| JP | 2005-350142 A | 12/2005 |
| JP | 2006-95472 A | 4/2006 |
| JP | 2006-200658 A | 8/2006 |
| JP | 2006-322604 A | 11/2006 |
| JP | 2007-191203 A | 8/2007 |
| JP | 2008-25738 A | 2/2008 |

OTHER PUBLICATIONS

Search Report dated Dec. 10, 2013 issued by the International Searching Authority in counterpart International Patent Application No. PCT/JP2013/076967 (PCT/ISA/210).

Written Opinion dated Dec. 10, 2013 issued by the International Searching Authority in counterpart International Patent Application No. PCT/JP2013/076967 (PCT/ISA/237).

Communication from the European Patent Office issued Apr. 28, 2016 in a counterpart European Application No. 13885525.9.

ROLLING BEARING AND ITS PACKAGING METHOD

CROSS-REFERENCE TO RELATED APPLICATIONS

This application is a continuation of U.S. application Ser. No. 14/655,403 filed Jun. 25, 2015, which is U.S. National Stage of International Application no. PCT/JP2013/076967 filed Oct. 3, 2013, which claims priority to Japanese Application No. 2013-115810 filed May 31, 2013. The entire disclosures of the prior applications are considered part of the disclosure of the accompanying continuation, and are hereby incorporated by reference.

TECHNICAL FIELD

The present invention relates a rolling bearing and its packaging method.

BACKGROUND ART

In recent years, for machine tool bearings (in particular, machine tool spindle bearings), minimal quantity lubrication methods such as oil lubrication, e.g., oil-air or oil-mist lubrication, and grease lubrication are used to reduce a temperature rise due to stirring resistance of lubricating oil. In oil lubrication, measures should be taken in view of a cost increase due to use of air, environmental considerations with regard to wind noise due to rolling elements cutting the air injected from a nozzle into a bearing interior and passing through the bearing interior, and outflow of used oil through an oil discharging hole, and also working environment considerations with regard to impact on human bodies, deterioration of visibility and the like due to floating of oil mists.

In light of such backgrounds, such as energy saving and reduction of environmental impact, for machine tool spindle bearings, there are increasing needs for a grease lubrication method in which there is no usage of air or outflow of lubricating oil.

Bearings are generally packaged during storage or transport, and are unpacked and charged with grease immediately before use. To prevent rusting during storage or transport, the bearings are packaged in a state in which antirust oil is applied to the entire surface of the bearing. Accordingly, if the bearing is charged with grease directly after the unpacking, the grease does not firmly adhere to a surface to be lubricated due to the antirust oil, and the grease may leak out at an early stage during an initial running-in period or in a subsequent operation, resulting in a grease life being reduced.

In particular in the case of machine tools, the maximum dmn value of a bearing during its operation is high, at least 500,000, and low temperature rise characteristics are required. Accordingly, to prevent stirring resistance due to excessive lubricant, a grease charge amount is reduced as compared with bearings used in general applications, such as motor bearings. A charging amount of grease in a bearing for a machine tool is 10 vol % to 20 vol %, sometimes 10 vol % to 15 vol % of a bearing interior space. Therefore, if a bearing for a machine tool is charged with grease directly after the unpacking as described above, the grease leaks out and the amount of residual grease becomes extremely small.

In addition, in grease lubrication, lubricating oil inside the bearing is not exchanged during use. Accordingly, if foreign substances enter the bearing interior during packaging, the foreign substances remain and hinder a rotation.

Therefore, after the unpacking and before charging with grease, it is necessary to clean and degrease bearings to remove the adhered antirust oil and foreign substances inside the bearings, causing a burden when mounting the bearings. Thus, the applicant proposes, in Patent Document 1, applying antirust oil on a surface of a bearing at a film thickness of 40 μm or less, packaging the entire bearing with a volatile corrosion inhibitor film, and keeping a pressure-reduced condition between the volatile corrosion inhibitor film and the bearing. Because an adhered amount of the antirust oil is 40 μm or less, effects on grease can be suppressed even if the grease is provided without undergoing cleaning and degreasing after the unpacking. Also, due to an airtight packaging by the volatile corrosion inhibitor film, a sufficient antirust effect can be obtained even if the adhered amount of antirust oil is reduced to 40 μm or less.

PRIOR ART DOCUMENT

Patent Document

Patent Document 1: JP 2006-322604 A

SUMMARY OF INVENTION

Problem to be Solved by Invention

However, there are strong demands for further reducing effects on grease by reducing the adhered amount of antirust oil, and accordingly, it is an object of the present invention to provide a rolling bearing in which a favorable antirust performance can be obtained while further reducing the amount of antirust oil than before.

Means for Solving the Problem

To solve the above object, the present invention provides a rolling bearing and its packaging method described below.
(1) A rolling bearing including an inner ring, an outer ring, and a plurality of rolling elements retained between the inner ring and the outer ring by a retainer in a rollable manner, wherein antirust oil is provided to adhere, at an average film thickness of 4.5 μm to 10 μm, to an entire surface of the bearing from which chloride ions and sulfate ions are removed, the entire bearing is covered with a volatile corrosion inhibitor film, and a space between the volatile corrosion inhibitor film and the bearing is kept in a pressure-reduced condition.
(2) The rolling bearing according to (1), wherein an amount of residual chloride ions adhered to the rolling bearing per unit area is 0.2 ng/mm$^2$ 10 ng/mm$^2$.
(3) The rolling bearing according to (1) or (2), wherein the entire bearing is covered with the volatile corrosion inhibitor film and the space between the volatile corrosion inhibitor film and the bearing is kept in the pressure-reduced condition, in a state in which a bearing interior space defined by the inner ring, the outer ring and the rolling elements is charged with grease.
(4) A method of packaging a rolling bearing after assembling the rolling bearing from bearing components, the method including after removing chloride ions and sulfate ions from the entire surface of the bearing, providing antirust oil to adhere thereto at an average film thickness of 4.5 μm to 10 μm, and covering the entire bearing with a volatile corrosion inhibitor film such that a space between the volatile corrosion inhibitor film and the bearing is kept in a pressure-reduced condition.

(5) The method of packaging the rolling bearing according to (4), wherein the chloride ions and the sulfate ions are removed from the entire surface of the rolling bearing such that an amount of residual chloride ions adhered to the rolling bearing per unit area is 0.2 ng/mm$^2$ to 10 ng/mm$^2$.

(6) The method of packaging the rolling bearing according to (4) or (5), wherein after the adhesion of the antirust oil, a bearing interior space defined by an inner ring, an outer ring and rolling elements is charged with grease, and the entire bearing is covered with the volatile corrosion inhibitor film such that the space between the volatile corrosion inhibitor film and the bearing is kept in the pressure-reduced condition.

Advantageous Effects of Invention

According to the present invention, because the antirust oil is provided to adhere after removing chloride ions and sulfate ions and then sealed and packaged by a volatile corrosion inhibitor film, a favorable antirust performance can be obtained while reducing an adhered amount of antirust oil than before. Therefore, even if grease is provided without cleaning or degreasing after unpacking, effect by the antirust oil is further reduced, so that lubrication performance and lifetime are improved.

EMBODIMENTS OF INVENTION

Hereinafter, the present invention will be described in detail with reference to the drawings.

According to a rolling bearing of the present invention, after assembling, and after removing chloride ions and sulfate ions from the entire surface of the bearing, antirust oil provided to adhered thereto and is sealed by a volatile corrosion inhibitor film. By removing the rust-inducing chloride ions and the sulfate ions, a favorable antirust performance can be ensured even with an adhered amount of antirust oil being reduced to an average film thickness of 4.5 μm to 10 μm, so that effect of the antirust oil on grease can be eliminated even if the grease is provided without cleaning or degreasing after unpacking.

Chloride ions and sulfate ions are adhered to the bearing surface from various machines or chemicals and workers during manufacturing processes of the bearing. To remove chloride ions and sulfate ions, for example, it may be cleaned with a water substitution type cleaning liquid. By this cleaning, it is preferable that an amount of the residual chloride ions on the surface of the rolling bearing be 0.2 ng/mm$^2$ to 10 ng/mm$^2$.

Grinding is mostly used in the manufacturing processes of the rolling bearing, but grinding is generally performed while applying a large amount of grinding water to prevent dimensional changes of products due to heat accompanied with such processing. A tap water is used as the grinding water, and the tap water inevitably contains chlorine components, namely chloride ions.

Under the Waterworks Law, an amount of chloride ions in the tap water is regulated to be kept to 0.1 mg/L or more, and also defined is a water quality management target value by which the upper threshold is limited to 1 mg/L or less in view of taste or smell. Therefore, in the manufacturing of the rolling bearing, the grinding water will also contain chloride ions of 0.1 mg/L to 1 mg/L. During grinding, a large amount of grinding water of approximately several tens liters is applied to the rolling bearing, and thus a significant amount of chloride ions are adhered on the rolling bearing.

In addition, a large amount of chloride ions is contained in human body fluids (such as sweat or saliva), and thus chloride ions are remained in locations where hands are touched. Further, chloride ions are also contained in the atmosphere, and thus, chloride ions in the atmosphere are adhered on the rolling bearing exposed to the atmosphere. Even if the rolling bearing is contained in a sealed container to prevent exposing to the atmosphere, adhesion of a trace amount of chloride ions thereon is inevitable.

Figure 1:
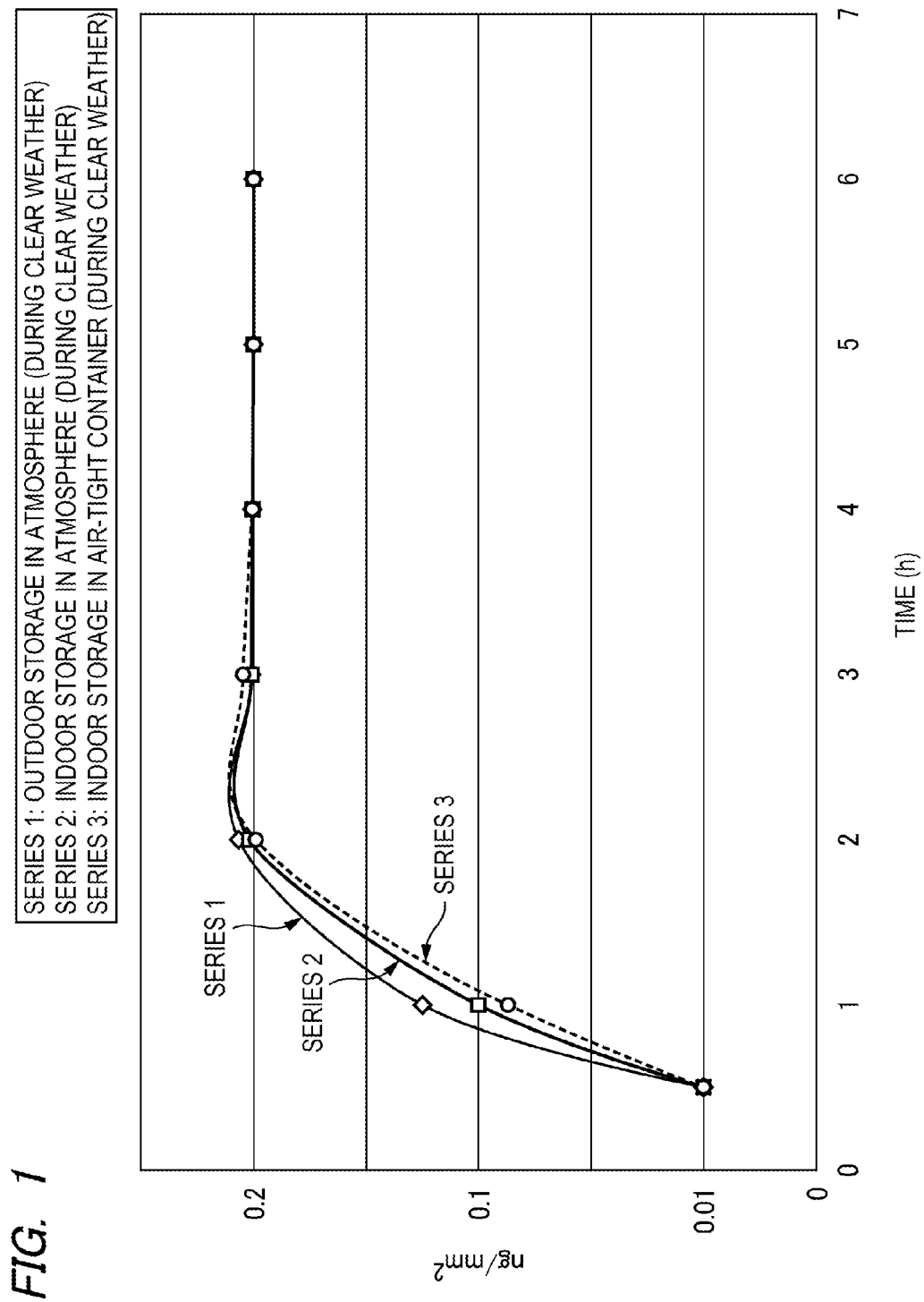
FIG. 1 is a graph showing a relationship between storage conditions of bearings and amounts of residual chloride ions on surfaces of the bearings.

In FIG. 1, a relationship between storage conditions (outdoor storage in the atmosphere, indoor storage in the atmosphere, and indoor storage in an air-tight container) of bearings and amounts of residual chloride ions on surfaces of the bearings is shown. The measurement of amounts of residual chloride ions was performed according to the following procedures (rubber gloves are used in each step) and also was performed using a chlorine ion detector tube 201SA produced by Komyo Rikagaku Kogyo K.K.

(Measurement Method)

(1) Masking portions other than a measurement portion (such as a bearing outer peripheral surface) on a bearing by a masking tape after being stored in the atmosphere or in a sealed container for a predetermined period of time.

(2) Providing deionized water of 100 mL in a poly beaker.

(3) Folding a gauze suitably and soaking it in the deionized water in the beaker.

(4) Wiping the measurement portion with the wetted gauze in parallel directions.

(5) Thoroughly rinsing the gauze is thoroughly with the deionized water in the beaker.

(6) Repeating (4) and (5).

(7) After collecting, thoroughly cleaning a surface of the used rubber gloves with a deionized water of 50 mL, and returning the deionized water used for the cleaning back in the beaker to use as a sample liquid.

(8) Cutting both ends of a chlorine ion detector tube by a tip cutter and placing the chlorine ion detector tube in the sample liquid with an arrow oriented upward.

(9) If salt exists in the sample liquid, a white discoloration layer appears from the lower end of the detector tube. When the sample liquid is permeated to the upper end of the detector tube, the detector tube is taken out and then chloride content in the sample liquid is read by a scale at a distal end of the discoloration layer.

As shown in FIG. 1, it can be found that, even if rolling bearings are stored in the atmosphere or in the sealed container, chlorides have been adhered thereon. The amount of residual chloride ions adhered to the bearing per unit area is calculated by the following equation, where V is an amount of residual chloride ions adhered to the bearing per unit area, T is an adhered amount of chloride ions, and S is a surface area of a measurement portion of the bearing used upon measuring of an amount of chloride ions.

$$V=T/S$$

Because the adhered chloride ions effect rusting of the rolling bearing, according to the present invention, the amount of chloride ions per unit area is limited to 0.2 ng/mm$^2$ to 10 ng/mm$^2$.

The antirust oil is not particularly limited if the antirust oil is one in which stickiness is hardly occurred so that workability is excellent and also an adhered amount thereof can be easily controlled, but, for example, antirust oil, which does not contain petrolatum, is preferably employed. In addition, to easily control an adhering amount of the antirust oil, viscosity of the antirust oil is preferably in a range of 10 cst to 60 cst.

Further, a method of adhering the antirust oil is not particularly limited if a film thickness thereof can be adjusted, but, for example, can include a centrifugal deoiling method, an air blowing method, or a vacuum heating method. In particular, to evenly adhere the antirust oil, the air blowing method is preferably employed.

An adhered amount of antirust oil is set to an average film thickness of 4.5 µm to 10 µm. If the average film thickness is less than 4.5 µm, it is difficult to keep antirust performance for a long time. In addition, because the antirust oil is reacted with grease to cause precipitation of crystals and thus to reduce an acoustic property, the reaction thereof with grease is likely to be occurred if the adhered amount of antirust oil exceeds an average film thickness of 10 µm.

The volatile corrosion inhibitor film may be a resin film, such as polyethylene film, containing an antirust agent, such as organic carboxylic acid amine salts, phosphoric acid amine salts, amine carbonate salts, heterocyclic amine salts, or the like. More specific examples of the antirust agents can include dicyclohexyl ammonium nitrite, dicyclohexyl ammonium caprylate, cyclohexylamine carbamate, cyclohexylamine laurate, diisopropyl ammonium nitrite, nitronaphthalene ammonium nitrite, ammonium benzoate, cyclohexylamine benzoate salts, dicyclohexylamine phosphate salts, and the like. To envelop the rolling bearing and to keep a pressure-reduced condition, the volatile corrosion inhibitor film in a form of a bag, as shown in FIGS. 1 to 5, is preferably used.

In addition, the volatile corrosion inhibitor film is preferably transparent, and by making the volatile corrosion inhibitor film transparent, stamping or the like can be checked in a packaged state. For example, when inspection results, such as dimensional differences, are directly imprinted on the bearing by a laser marker or the like, such inspection results can be checked without polluting the bearing. In particular, if being imprinted on an outer ring end surface, an inner ring end surface, an outer ring outer-diameter surface or the like, the inspection results can be more easily checked.

Further, the volatile corrosion inhibitor film and the bearing becomes a sealed state by reducing a pressure therebetween. Also, to keep such a pressure-reduced condition obtained by vacuum drawing, sealing, such as heat sealing, is performed.

By this packaging, rusting of the rolling bearing or adhering of foreign substances in the atmosphere thereto during storage or transport can be reliably prevented. In addition, cleaning or degreasing is not required, and also even when grease is provided therein, an effect of the antirust oil thereon is more reduced, thereby keeping a good lubricating ability.

The packaging described above may be performed in a state in which grease is provided in a bearing interior space defined by an inner ring, an outer ring and rolling elements, or in a state in which the grease is not provided. By packaging in a state in which the grease is provided, grease charge before use becomes unnecessary. Because the space between the volatile corrosion inhibitor film and the bearing is in a pressure-reduced condition, the packaging film enters a space between inner and outer rings in a concave manner to prevent grease from being flowed out even if it is vibrated during transport.

Figure 2:
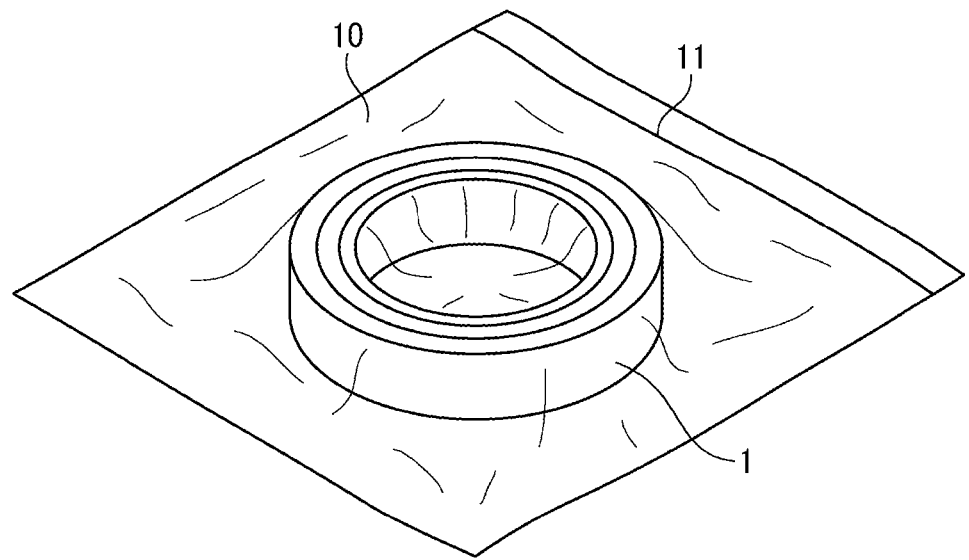
FIG. 2 is a perspective view showing an angular ball bearing as an example of a rolling bearing according to the present invention.

The present invention is not limited to types of rolling bearings, and for example, can be applied to packaging of an angular ball bearing 1 as shown in FIG. 2. Namely, the angular ball bearing 1 immediately after manufacturing is cleaned with a water substitution type cleaning liquid to remove chloride ions and sulfate ions and then after antirust oil is provided to adhered thereto at an average film thickness of 4.5 µm to 10 µm, is put in a bag made of a volatile corrosion inhibitor film 10, and the bag is vacuum drawn and sealed by heat sealing or the like. In the drawings, the reference numeral 11 denotes a sealing portion.

Figure 3:
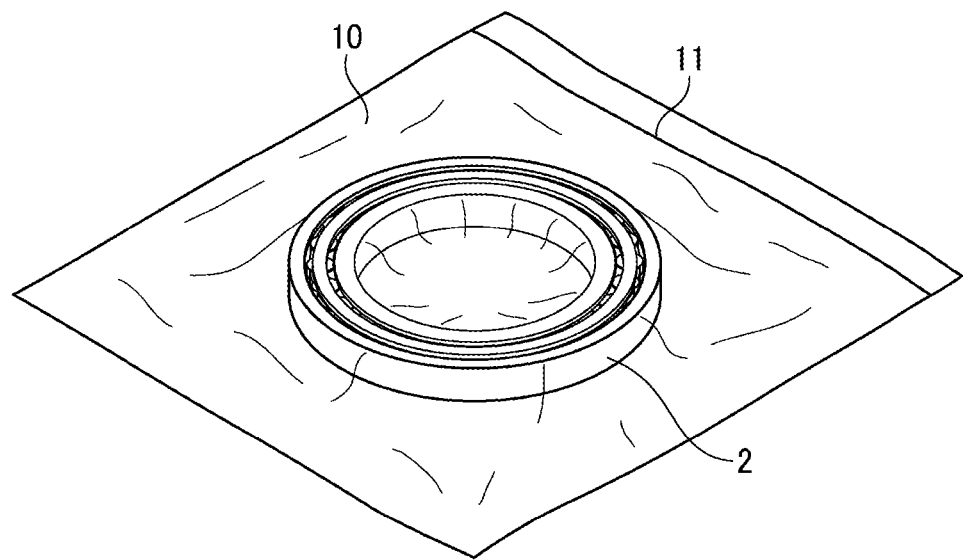
FIG. 3 is a perspective view showing a single-row cylindrical roller bearing as another example of a rolling bearing according to the invention.

As shown in FIG. 3, the present invention can be applied in a similar manner in packaging a single-row cylindrical roller bearing 2.

Figure 4:
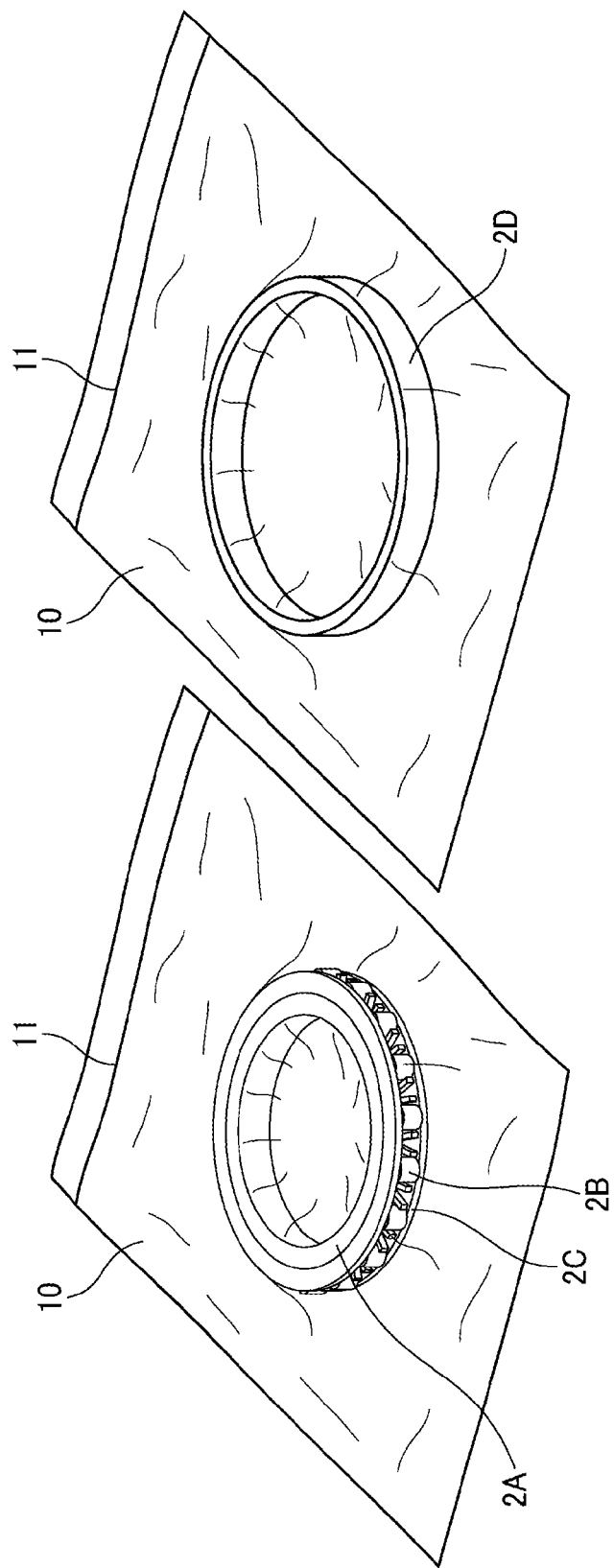
FIG. 4 is a perspective view showing a single-row cylindrical roller bearing as yet another example of a roller bearing according to the invention, illustrating a state in which an inner ring assembly, including an inner ring, rolling elements and a retainer assembled together, and an outer ring are separately packaged.

Also, as shown in FIG. 4, an inner ring-side member of the single-row cylindrical roller bearing 2, which includes an inner ring 2A, cylindrical rollers 2B and a retainer 2C assembled together with each other, and an outer ring 2D thereof may be put in separate bags made of a volatile corrosion inhibitor film 10. By separately storing the inner ring-side member and the outer ring 2D, a sealed state thereof can be kept until immediately before the bearing is mounted, thereby more effectively inhibiting adhering of foreign substances in the atmosphere or rusting. When the inner ring-side member and the outer ring 2D are separately packaged in this way, packaging is performed in a state in which grease is not enclosed therein.

Figure 5:
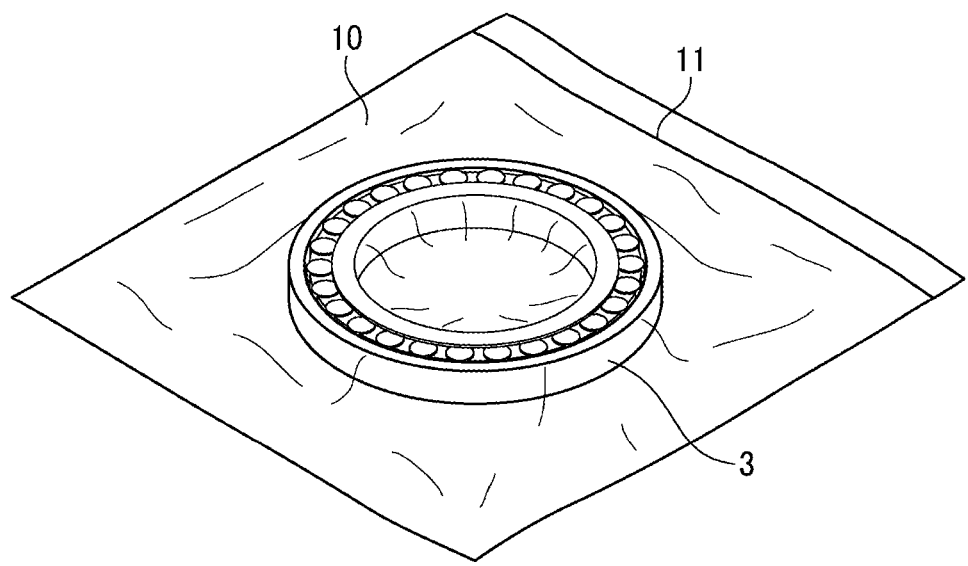
FIG. 5 is a perspective view showing a double-row cylindrical roller bearing as yet another example of a rolling bearing according to the invention.
Figure 6:
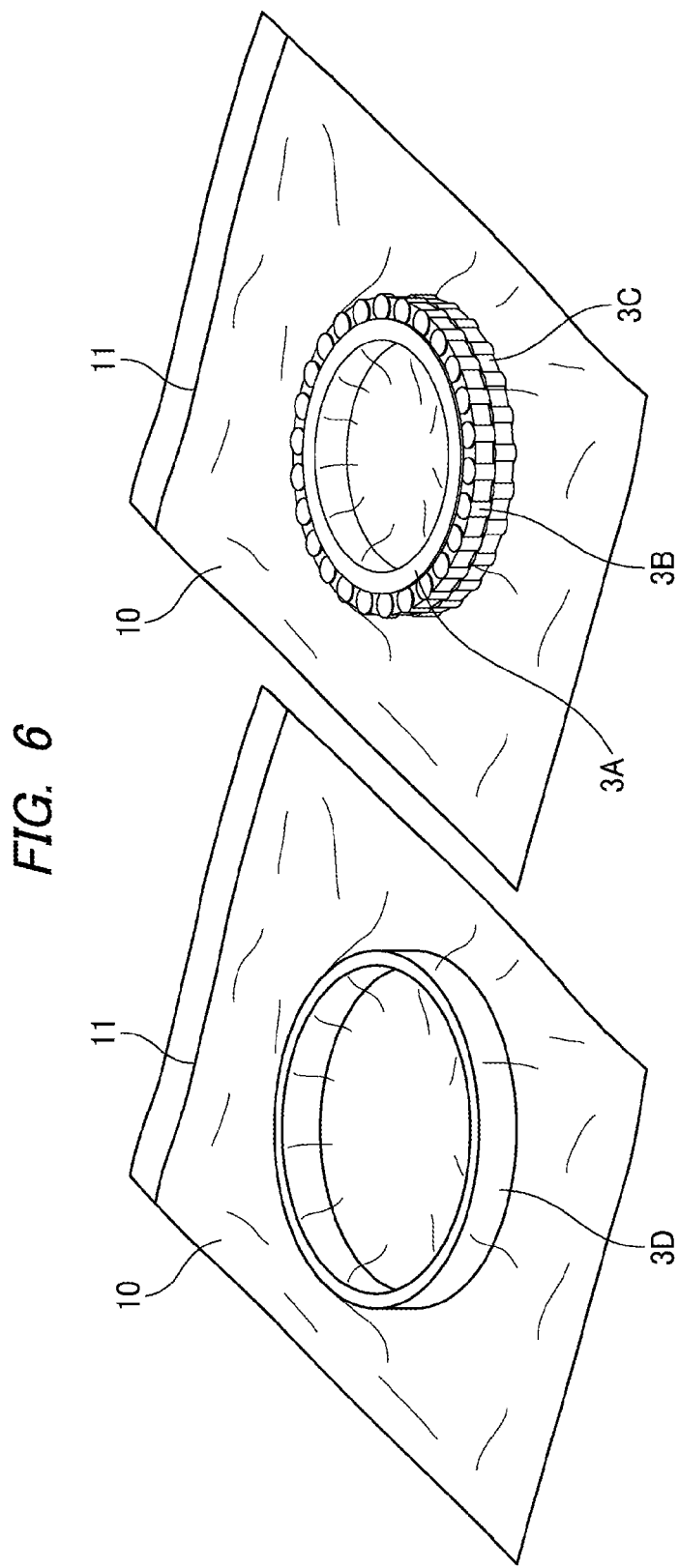
FIG. 6 is a perspective view showing a double-row cylindrical roller bearing as yet another example of a rolling bearing according to the invention, illustrating a state in which an inner ring assembly, including an inner ring, rolling elements and a retainer assembled together, and an outer ring are separately packaged.

In addition, a double-row cylindrical roller bearing 3 may be packaged as shown in FIG. 5 and also an inner ring-side member of the double-row cylindrical roller bearing 3, which includes an inner ring 3A, cylindrical rollers 3B and a retainer 3C assembled together with each other, and an outer ring 3D thereof may be put and sealed in separate bags made of a volatile corrosion inhibitor film 10 as shown in FIG. 6.

EXAMPLES

Now, the present invention will be further described with reference to Test Examples, but the present invention is not limited by this.

Test Example 1

Antirust Performance Test

Angular ball bearings (inner diameter: 40 mm, outer diameter: 68 mm, and width: 15 mm) of a bearing number 7008CTYNDBLP4 immediately after assembly were prepared and was cleaned with a water substitution type cleaning liquid ("Aqua Solvent" produced by Aqua Chemical Co., Ltd.) to remove chloride ions and sulfate ions on a surface thereof. Next, lubricating oil ("ANTIRUST P-2810" produced by JX Nippon Oil & Energy Corporation; viscosity: 12 cst), which does not include petrolatum, was adhered as an antirust agent on the entire surface of the bearings by an air blowing method while varying an adhering amount thereof. Then, the bearings were put in bags made of a volatile corrosion inhibitor film ("BOSELON®" produced by Aicello Chemical Co., Ltd.) and the bags were sealed by heat sealing after vacuum drawing, thereby obtaining test samples. Meanwhile, an average film thickness (t) of the antirust oil was calculated by the following equation, where $\Delta S$ is an adhered amount of antirust oil and S is the entire surface of rolling members (an outer ring, an inner ring, a retainer and rolling elements) of the rolling bearing). Also, the adhered amount ($\Delta S$) was obtained by measuring a difference (M) in weight before and after the antirust oil was adhered and dividing the difference by a specific gravity ($\rho$) of the antirust oil.

$$T=\Delta S/S \; (\Delta S=M/\rho)$$

Figure 7:
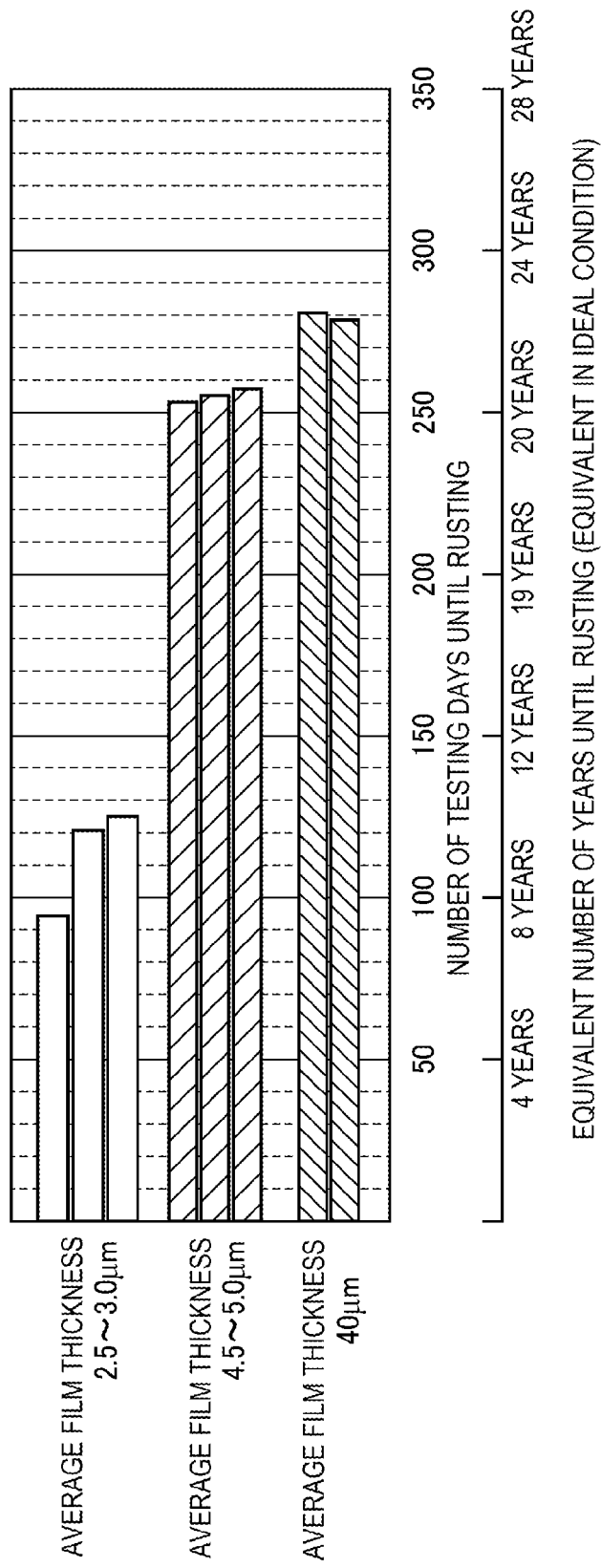
FIG. 7 is a graph showing results of Test Example 1.

Then, each test sample was left in a high temperature and high humidity environment of 50° C.—90% RH and periods of time until rust was occurred were compared. In the environment of 50° C.—90% RH, an effect of accelerating rusting by approximately 30 times is obtained as compared when samples were left at 20° C.—70% RH, which are the average temperature and humidity in Japan, and the equivalent numbers of years are shown in the figure. The results are shown in FIG. 7, but it can be found that, when the adhered amount of antirust oil is less than an average film thickness of 4.5 μm, antirust performance in a packed state is significantly decreased. From the results, it can be found that a favorable antirust performance can be kept for a long time by setting the adhered amount of antirust oil to an average film thickness of 4.5 μm or more.

Test Example 2

Grease Holding Ability Test

Figure 8:
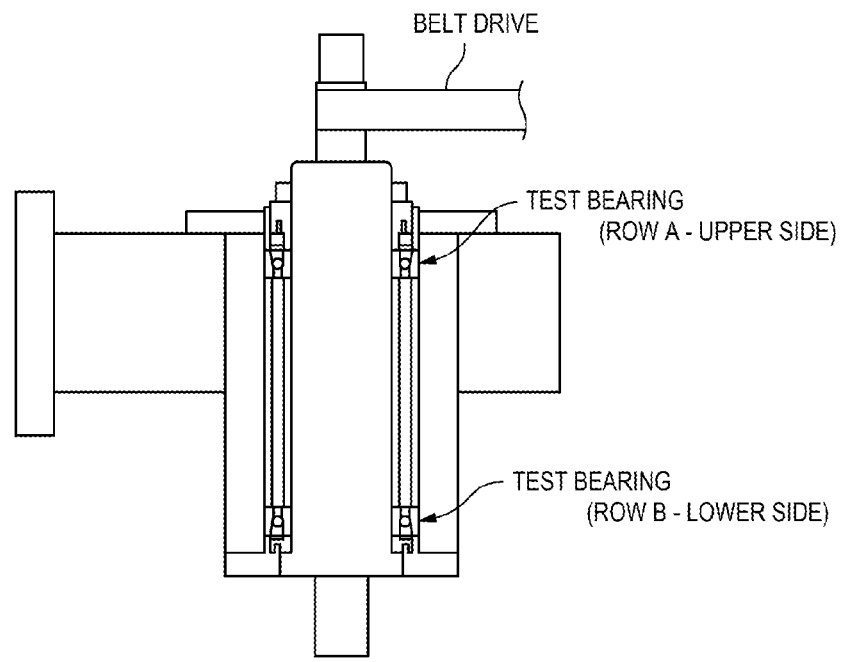
FIG. 8 is a diagram illustrating a test apparatus used in Test Example 2 and Test Example 4.

The test samples fabricated in Test example 1 were opened and then a bearing interior space defined by an inner ring, an outer ring and balls was charged with grease (MTE produced by NSK Ltd.) of 1.1 g (15% of the bearing interior space volume), thereby fabricating test bearings. Then, after rotating the bearings for 24 hours at conditions as described below, using a tester as shown in FIG. 8, grease residual rates were measured. Also, for comparison, the same bearings, on which cleaning and degreasing was performed and antirust oil was not adhered, were charged with grease to fabricate comparative test bearings, and grease residual rates were in the same manner. The term grease residual rate means a value which is obtained by subtracting a percentage, which is represented by a value obtained by dividing a difference between a bearing weight (M1) in a grease-charged condition before rotating and a bearing weight (M2) after rotating by a charged amount of grease (M3), from 100, and if the grease residual rate is low, a grease life is shortened.

Figure 9:
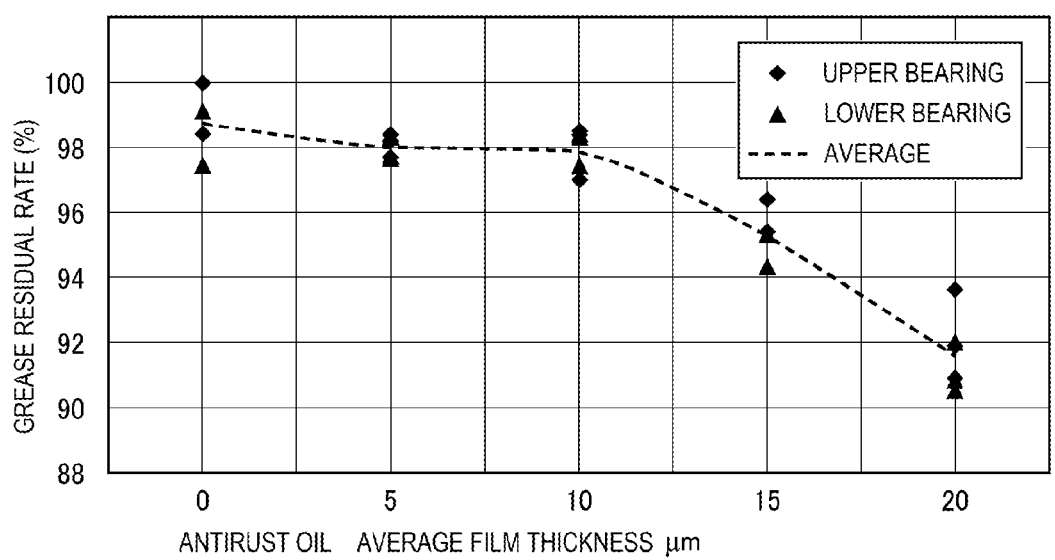
FIG. 9 is a graph showing results of Test example 2.

Pre-pressure upon mounting: 120N
Number of revolutions: 10000 min$^{-1}$(dm·n=54×10$^4$)
Operation position: Vertical
Driving method: Belt driving
Cooling of an outer cylinder: No The results are shown in FIG. 9, but it can be found that when the average film thickness is up to 10 μm, the test bearings have a grease residual rate of 97% on average as compared with the comparative test bearings having a grease residual rate of 99%, and therefore, the test bearings have a grease holding ability equivalent to those in a conventional using method in which grease charge is performed after cleaning and degreasing bearings. On the other hand, when the average film thickness is 15 μm or more, the grease residual rate tends to be decreased. From the results, it can be found that a grease holding ability equivalent to those in a conventional case, and thus a lubrication lifetime can be kept by setting the adhered amount of antirust oil to an average film thickness of 10 μm or less.

Test Example 3

Grease Precipitation Test

Test bearings prepared by cleaning deep groove ball bearings of a bearing number 6202 with a water substitution type cleaning agent, providing antirust oil to adhere at an average film thickness of 10 μm and then charging with grease (MTE or MTS produced by NSK Ltd., or ISOFLEX NBU 15 produced by NOK KLUBER Co., Ltd.), and comparative test bearings prepared by cleaning and degreasing, and charging with the grease without providing the antirust oil to adhere, were fabricated, 10 units for each test bearing, 60 units in total.

Also, after each test bearing was placed in a constant temperature bath and then a heating cycle in which the temperature is changed from "0° C.→30° C.→60° C." every few hours, was repeated 7 times, a noise count measurement was performed one time, and such a measurement was performed 4 times in total. Noise counts before and after heating cycles of bearings were measured using a noise tester mounted in a known anderon device (acoustic measurement device).

Figure 10:
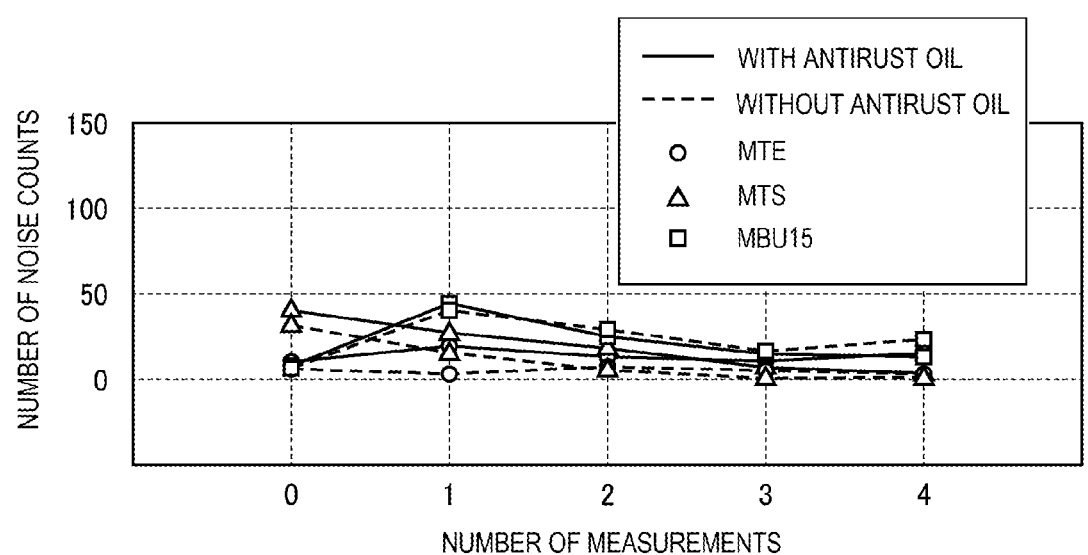
FIG. 10 is a graph showing results of Test example 3.

The results are shown in FIG. 10, but no significant difference between test bearings and comparative test bearings in initial noise count number and noise count number after heating cycles of 4 times was exhibited. From the results, it can be found that, by setting the adhered amount of antirust oil to an average film thickness of 10 μm or less, precipitation of crystals due to reaction of grease is not occurred.

Test Example 4

Bearing Temperature Rise Test

Test samples, in which the adhered amount of antirust oil in Test example 1 were adjusted to an average film thickness of 10 μm, were opened and then were charged with grease (MTE produced by NSK Ltd.) of 1.1 g (15% of the bearing interior space volume), thereby fabricating test bearings. Also, for comparison, comparative test bearings, which were charged with grease without adhering antirust oil after cleaning and degreasing, were fabricated. Then, each test bearing was rotated at conditions as described below, using the test apparatus used in Test example 2, and a temperature of the outer ring thereof at that time was measured.

Figure 11:
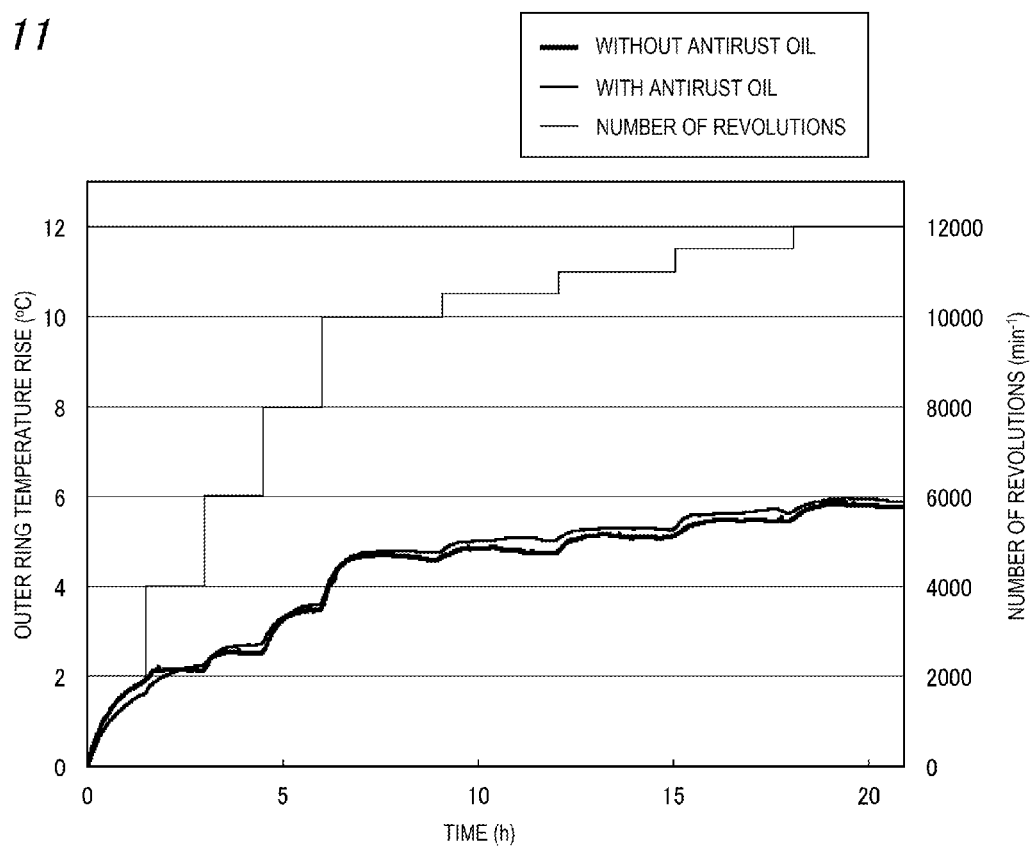
FIG. 11 is a graph showing results of Test example 4.

Pre-pressure upon mounting: 120N
Number of revolutions: 12000 $\text{min}^{-1}$ ($dm \cdot n = 65 \times 10^4$)
Operation position: Vertical
Driving method: Belt drive
Cooling of outer cylinder: No The results are shown in FIG. 11, but no significant difference between test bearings, on which the antirust oil was adhered at the average film thickness of 10 μm, and comparative test bearings in temperature rise characteristics was exhibited. From the results, it can be found that a temperature rise characteristics equivalent to those in a conventional case can be kept by setting the adhered amount of antirust oil to an average film thickness of 10 μm or less.

(Verification of Residual Chloride Ion Amount)

After rolling bearings were fabricated by typical grinding process and all surfaces thereof were ground, chloride ions adhered thereon were removed to become below a detection limit of an analyzer.

After such pretreatment, chloride ions were newly adhered by treatments shown in Table 1, and then an amount of chloride ions was measured. For the measurement, after rolling bearings were immersed in a bath, in which a predetermined amount of ultrapure water was filled, during 2.5 hours at a temperature of 80° C. so that chloride ions were dissolved, a liquid was collected from the bath and then an amount of chloride ions therein were measured by a ion chromatography analyzer, DX-120, and a separation column, IonPacAS 12A (4 mm), which are produced by Dionex K.K. The measurement method was performed at conditions identical to those of Explanation FIG. 6 of JIS K0127. Qualification was performed for chloride ions, thereby calculating an amount per unit area. The results are shown in Table 1.

For rolling bearings, on which the same treatment was performed, a rusting acceleration test was performed. In the rusting acceleration test, after the antirust oil was applied to the rolling bearings at an average film thickness of 4.5 μm and the rolling bearings are left for thirty days in a high temperature and high humidity environment of 50° C., 90% RH, whether or not the surfaces of rolling bearings were rusted was verified. The results are shown in Table 1.

TABLE 1

| Samples | Bearing surface treatment method | Amount of chloride ions | Rusting |
|---|---|---|---|
| 1 | Applying chloride ions by hand | 13 ng/mm² | Yes |
| 2 | Cleaning Sample 1 to remove chloride ions | 5 ng/mm² | No |
| 3 | Applying artificial fingerprint liquid defined by JIS K 2246 | 25 ng/mm² | Yes |
| 4 | Cleaning Sample 3 to remove chloride ions | 10 ng/mm² | No |

As shown in Table 1, rusting can be prevented when an amount of chloride ions is 5 ng/mm² to 10 ng/mm².

In addition, assuming that an amount of chloride ions contained in a grinding water is 0.1 mg/L, which is a minimum defined in the Waterworks Law, it is believed that rolling bearings, which are typically ground and from which chloride ions does not removed, have chloride ions of few tens to few hundreds ng/mm² adhered thereon, but when chloride ions are not removed, rusting cannot be prevented if the antirust oil has a thin film thickness of less than 4.5 μm.

From this test, it can be found that, when an amount of chloride ions, which have been adhered on rolling bearings after removing chloride ions therefrom, is set to 0.2 ng/mm² to 10 ng/mm², a favorable antirust performance can be obtained by setting a film thickness of the antirust oil to 4.5 μm or more (4.5 μm to 10 μm) as defined in the prevent invention.

Although the present invention has been described with referenced to the detailed and specific embodiments, it should be apparent to those skilled in the art that numerous changes and modifications can be made without departing the scope and spirit of the present invention.

This application is based on Japanese Patent Application No. 2013-115810 filed on May 31, 2013, the entire content of which is incorporated herein by reference.

INDUSTRIAL APPLICABILITY

The present invention is suitable for storing and transporting machine tool bearings (in particular, machine tool spindle bearings).

DESCRIPTION OF REFERENCE SIGNS

1 Angular ball bearing
2 Single-row cylindrical roller bearing
2A Inner ring
2B Cylindrical roller
2C Retainer
2D Outer ring
3 Double-row cylindrical roller bearing
3A Inner ring
3B Cylindrical roller
3C Retainer
3D Outer ring
10 Volatile corrosion inhibitor film
11 Sealing portion

What is claimed is:

1. A rolling bearing comprising an inner ring, an outer ring, and a plurality of rolling elements retained between the inner ring and the outer ring by a retainer in a rollable manner,
wherein antirust oil is provided to adhere, at an average film thickness of 4.5 μm to 10 μm, to an entire surface of the bearing from which chloride ions and sulfate ions are removed, and the bearing is put in a bag made of a volatile corrosion inhibitor film.

2. The rolling bearing according to claim 1, wherein an amount of residual chloride ions adhered to the rolling bearing per unit area is 0.2 ng/mm² to 10 ng/mm².

3. The rolling bearing according to claim 2, wherein the bearing is put in the bag in a state in which a bearing interior space defined by the inner ring, the outer ring and the rolling elements is charged with grease.

4. The rolling bearing according to claim 2, wherein the bearing is sealed by the bag.

5. The rolling bearing according to claim 1, wherein the bearing is put in the bag in a state in which a bearing interior space defined by the inner ring, the outer ring and the rolling elements is charged with grease.

6. The rolling bearing according to claim 1, wherein the bearing is sealed by the bag.

7. A method of packaging a rolling bearing after assembling the rolling bearing from bearing components, the method comprising:

after removing chloride ions and sulfate ions from an entire surface of the bearing, providing antirust oil to adhere thereto at an average film thickness of 4.5 μm to 10 μm, and putting the bearing in a bag made of a volatile corrosion inhibitor film.

8. The method of packaging the rolling bearing according to claim 7, wherein the chloride ions and the sulfate ions are removed from the entire surface of the rolling bearing such that an amount of residual chloride ions adhered to the rolling bearing per unit area is 0.2 ng/mm$^2$ to 10 ng/mm$^2$.

9. The method of packaging the rolling bearing according to claim 8, wherein after the adhesion of the antirust oil, a bearing interior space defined by an inner ring, an outer ring and rolling elements is charged with grease.

10. The method of packaging the rolling bearing according to claim 8, wherein the bearing is sealed by the bag.

11. The method of packaging the rolling bearing according to claim 7, wherein after the adhesion of the antirust oil, a bearing interior space defined by an inner ring, an outer ring and rolling elements is charged with grease.

12. The method of packaging the rolling bearing according to claim 7, wherein the bearing is sealed by the bag.

* * * * *